Dec. 27, 1966  G. F. CERLES  3,294,243
STUFFING BOX CONSTRUCTION
Filed Sept. 10, 1963
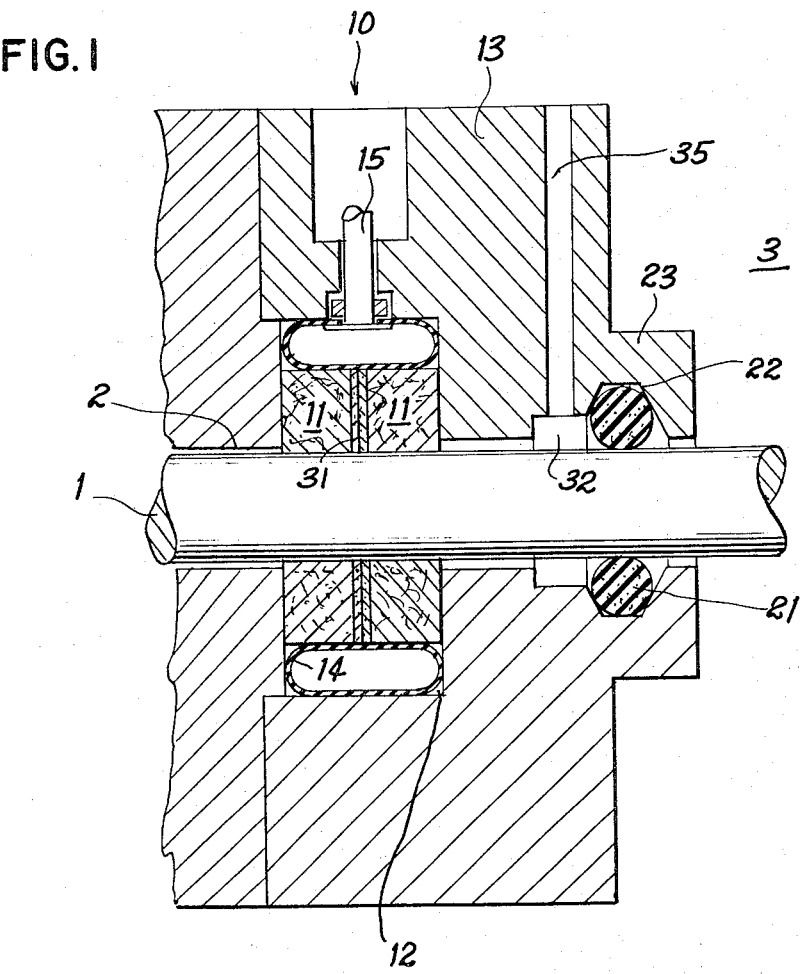
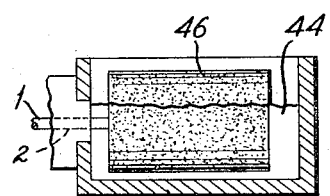
INVENTOR.
Georges Francois Cerles
BY
Ooms, McDougall and Hersh
Att'ys

United States Patent Office 3,294,243
Patented Dec. 27, 1966

3,294,243
STUFFING BOX CONSTRUCTION
Georges F. Cerles, Rue Hoche a Gardanne,
Bouches-du-Rhone, France
Filed Sept. 10, 1963, Ser. No. 308,026
Claims priority, application France, Sept. 19, 1962,
909,503
8 Claims. (Cl. 210—402)

This invention relates to a stuffing box construction of the type employed for protecting bearings associated with rotatable shafts.

It is well-known that the bearings in various constructions must be protected from the introduction of abrasive materials which would disrupt the proper operation of the apparatus. In order to protect bearings under conditions where the introduction of abrasive materials is likely, stuffing boxes have been devised. In some instances, stuffing boxes have included plastic packings which are pressed against the shaft carried by the bearing. In such instances, the plastic packing is designed to prevent migration of abrasive substances along the shaft surface into the vicinity of the bearing.

In other constructions, liquids under pressure have been associated with the rotating shaft. In such instances, a space was defined in the mounting means for the shaft and fluid under pressure was forced into this space. By maintaining the pressure in excess of the pressure exerted on abrasive substances in the vicinity of the shaft, the movement of these substances along the shaft could be prevented.

The known stuffing box arrangements described above have been characterized by various disadvantages. With respect to the plastic packing, this material has been found to have a relatively short effective life. Accordingly, frequent shutdowns of the equipment employing this type of stuffing box are necessary in order to replace the plastic packing.

In the case of stuffing boxes which utilize liquid under pressure, it has been found that it is practically impossible to prevent the liquid from penetrating into the bearing. Since this is the case, it has been found necessary to provide a protective liquid which will not detrimentally affect the lubricating conditions of the bearing. A lubricating oil is thus employed in most cases in a stuffing box of this nature; however, such a liquid is not desirable since packing materials associated with stuffing boxes are subject to harmful effects when contacted by oil.

It has also been recognized that the bearing protected by the stuffing boxes will, after a certain period, begin to assume an oval shape. The oval shape will arise more or less quickly depending on the bearing pressure; however, in any case, the shaft carried by the bearing will cease to rotate about a fixed axis. Where plastic packing is employed as a stuffing box, the packing will no longer apply uniform pressure to the shaft. Accordingly, defects in the seal provided by the packing arise and, therefore, the stuffing box becomes useless. The wear of the bearing also detrimentally affects operations where a liquid pressure stuffing box is being utilized. In such cases, a greater amount of the pressurized liquid will penetrate to the bearing and also to the abrasive material situated on the opposite side of the pressure chamber.

It is an object of this invention to provide an improved stuffing box for use in the protection of bearings in constructions employed in the vicinity of abrasive substances.

It is a more specific object of this invention to provide a stuffing box construction which overcomes difficulties characteristic of the prior art in that the construction prevents the migration of abrasive substances and also pressure applying liquids to the area of the bearing.

It is a further specific object of this invention to provide a stuffing box construction which is adapted to operate to provide protection for bearings even after the bearings have assumed an oval configuration.

These and other objects of this invention will appear hereinafter and for purposes of illustration but not of limitation, specific embodiments of this invention are shown in the accompanying drawing in which:

FIGURE 1 comprises a vertical sectional view of one possible variation of the stuffing box of this invention; and, FIGURE 2 is a schematic illustration of a stuffing box of this invention associated with a drum filter.

The stuffing box construction of this invention generally comprises a first member comprising a plastic packing surrounding a shaft which is rotatable in the bearing to be protected. A second plastic packing is associated with the shaft at a point intermediate the first packing and the bearing. Pressure applying means are associated with this second packing, and means are provided for maintaining the application of pressure by this means.

The stuffing box also includes an open space communicating with the shaft and defined between the plastic packings referred to. Means are provided for introducing liquid into this open space and for maintaining a specific pressure on this liquid.

In accordance with the specific form contemplated by this disclosure, the stuffing box of this invention provides a hollow flexible tube for use as the pressure applying member. Valve means associated with this tube enable build-up of pressure therein whereby relatively uniform force can be applied around the associated plastic packing.

The flexible tube and associated plastic packing are disposed in a first annular chamber located adjacent the bearing to be protected. A second annular chamber on the side of this combination opposite the bearing provides for the insertion of the second plastic packing. The open space between these packings is adapted to confine a liquid under pressure whereby the combined system will eliminate any tendency for abrasive material to migrate along the shaft toward the bearing.

In the use of the stuffing box of this invention, the pressure applied to the plastic packing by the flexible tube is maintained at a relatively high point. The pressure of the liquid adjacent this packing is maintained at a lower level whereby passage of liquid beyond the packing is prevented. With this arrangement, a liquid which will not tend to be harmful to the packing can be employed. There is no need to utilize a lubricating oil since the pressure arrangement described prevents the passage of the pressure liquid to the bearing area.

The pressure of the liquid is maintained at a level above the pressure exerted on the abrasive substances which necessitate the use of the stuffing box. Accordingly, there will be no tendency for the abrasive substances to move past the first plastic packing into the open space provided for maintaining the pressure liquid. To the contrary, the higher pressure which characterizes this liquid will result in flow of this liquid in opposition to movement of the abrasive substance along the shaft. The prevailing pressure conditions described thus cooperate to avoid entrance of abrasive material and deterioration of parts in the stuffing box.

The drawing illustrates a stuffing box adapted to be associated with a shaft 1. This shaft in turn is rotatably received by the bearing 2. The area 3 defines an area comprising a potential source of abrasive material. Accordingly, movement of this abrasive material from right to left into the vicinity of the bearing 2 is to be prevented by the provision of the stuffing box elements.

The stuffing box construction includes a first area 10 having a plastic packing 11 located to surround the shaft 1. The packing 11 is included in an annular chamber which also confines a flexible tubular member 14 surrounding the plastic packing 11. A valve 15 communicates with the interior of the tubular member whereby pressure can be built-up in the tubular member. It will be apparent that the degree of pressure applied by the packing 11 to the shaft 1 will depend on the pressure built-up on the tubular member 14. Furthermore, the pressure applied to the shaft will be substantially uniform because of the inherent character of the tubular member.

The housing 13 which defines the chamber 12 also defines in neck 23 a chamber 22, which chamber snugly receives a second plastic packing member 21. An open space 32 is defined between the plastic packings and a tube 35 communicates with this open space. The provision of liquid material within this open space permits the formation of a highly desirable pressure differential in the construction. Specifically, liquid is included in this open space under a pressure which is less than the pressure applied by the flexible member 14, and which exceeds the pressure applied to the abrasive material in the area 3. With this combination, movement of abrasive material beyond the plastic packing 21 is virtually eliminated. Any material migrating to the space 32 will not further migrate due to the higher pressure applied to the plastic packing 11.

The construction of this invention is particularly advantageous when the bearing 2 has worn to the extent that an oval shape is defined by the bearing. Under such conditions the pressure applying member 14 will still press against the shaft 1 with the same degree of force. Even though the axis of the shaft may tend to be displaced during rotation by reason of the oval shape, this pressure applying system will insure a seal preventing undesired movement of abrasive substances. Furthermore, there is no loss of seal which would permit passage of the liquid in the open space 32 into contact with the bearing.

The construction described above has been employed with particular advantages as a stuffing box in an immersed drum filter. Such filters have been employed for filtering aluminum hydroxide obtained from bauxite in accordance with the well-known Bayer process. As shown in FIGURE 2, a drum filter of this type comprises a large vessel 42 containing the abrasive alumina suspension 44. A hollow cylindrical drum 46 having porous walls is mounted on a shaft 1 within the vessel and is rotated around, while being partially immersed, in the material to be filtered. With the construction of this invention, the product which can be realized from such a filter drum can be greatly enhanced. Specifically, it has been recognized that the product of the filter is directly proportional to the percentage of the drum which is immersed in the suspension. Where the degree of immersion of the drum can be increased, a greater contact with the suspension can be achieved and the filter operation enhanced to a corresponding degree.

To consider a specific example, it has been noted that if the drum can be immersed up to a level corresponding to 0.6 of its diameter, then production can be increased 30 percent when considering immersion of about 0.4 of the drum diameter. Where immersion exceeds about 40 percent, then substantial amounts of the suspension reach the axis level of the drum, and the tendency toward introduction of abrasive substances is greatly increased. Immersion to a level beyond 40 percent is, therefore, avoided where conventional stuffing box constructions must be relied on. In accordance with the instant invention, drum immersion in the order of 60 percent can be readily undertaken whereby the desired increase in production can be achieved without the danger of harmful effects in the filter apparatus.

The filter drum 46 comprises a hollow cylinder having porous walls and means are associated with this drum for maintaining a pressure below atmospheric within the drum. The shaft 1 attached to the drum is mounted in the bearing 2 and where a stuffing box of this invention is employed, this shaft can be fitted whereby it will be at least partially immersed in the suspension including the abrasive material.

Various conventional materials may be employed for achieving the construction of this invention. The packing 11 may comprise a pair of asbestos cords and a gasket 31, located perpendicular to the shaft may be employed to separate these members. The plastic packing 21 may be formed of a graphitized rubber and the pressure applying member 14 may comprise a rubber tube similar to a tire tube.

In a typical operation, water under a pressure of about 6 atmospheres may be included in the tube 14. Water may also be supplied to the space 32 by means of the tube 35 under a pressure of about 1.5 atmospheres. In a filter drum of the type discussed above, the pressure applied to the abrasive substance will be below atmospheric. Accordingly, the highest pressure will exist in the area of the plastic packing 11 and the lowest pressure will prevail in the drum. There will be little or no tendency for any abrasive material to move toward the bearing area with an arrangement of this nature.

The stuffing box construction described may be employed for shaft and bearing combinations which rotate relative to each other or which are characterized by relative axial movement. In addition, constructions which operate with a combination of such movements wherein the axis of the shaft remains in substantially the same position can also be modified by the provision of the described stuffing box.

It will be understood that various changes and modifications may be made in the construction described which provide the characteristics of this invention without departing from the spirit thereof particularly as defined in the following claims.

That which is claimed is:

1. In an apparatus comprising a rotatable shaft and an associated bearing, and wherein abrasive material is located in the vicinity of said shaft, the improvement comprising a stuffing box located to prevent migration of said abrasive material to the vicinity of said bearing, said stuffing box comprising a housing, a first annular chamber defined by said housing, a first plastic packing included within said chamber and surrounding said shaft in close fitting relationship therewith, a second plastic packing included within said second chamber and surrounding said shaft in close fitting relationship therewith, said second chamber and packing being located between said first chamber and said bearing, a pressure applying member comprising a flexible tubular member surrounding said second packing, means for introducing fluid under pressure into said tubular member for increasing the pressure applied by said second packing to said shaft, an open space defined between said packings, and means for introducing fluid under pressure into said open space.

2. An apparatus in accordance with claim 1 wherein the pressure of the fluid in said open space exceeds the pressure applied to said abrasive material, and wherein the pressure exerted by said pressure applying member exceeds the pressure in said open space.

3. In an apparatus for the handling of abrasive material wherein a member of said apparatus is mounted for rotational movement in contact with said material, and wherein said member comprises a rotatable shaft and an associated bearing, the improvement comprising a stuffing box located to prevent migration of said abrasive material to the vicinity of said bearing, said stuffing box comprising a housing, a first annular chamber defined by said housing and located in communication with said abrasive material, a first plastic packing included within said chamber and surrounding said shaft, in close fitting relationship therewith, a second, larger, annular chamber defined by said housing, a second plastic packing included within said second chamber and surrounding said shaft in close fitting relationship therewith, said second chamber and packing being located between said first chamber and said bearing, a pressure applying member comprising a flexible tubular member surrounding said second packing, means for introducing fluid under pressure into said tubular member for increasing the pressure applied by said second packing to said shaft, an open space defined between said packings, and means for introducing fluid under pressure into said open space the pressure of the fluid in said open space exceeding the pressure applied to said abrasive material, and wherein the pressure exerted by said pressure applying member exceeds the pressure in said open space.

4. In a filter apparatus for use in combination with abrasive material wherein said apparatus comprises a rotatable drum including porous wall portions, said drum including a shaft and a bearing carrying said shaft, and wherein in the operation of said apparatus the axis defined by said shaft is located below the level of said abrasive material, the improvement comprising a stuffing box comprising a housing, a first annular chamber defined by said housing, a first plastic packing included within said chamber and surrounding said shaft in close fitting relationship therewith, a second plastic packing included within said second chamber and surrounding said shaft in close fitting relationship therewith, said second chamber and packing being located between said first chamber and said bearing, a pressure applying member comprising a flexible tubular member surrounding said second packing, means for introducing fluid under pressure into said tubular member for increasing the pressure applied by said second packing to said shaft, an open space defined between said packings, and means for introducing fluid under pressure into said open space.

5. An apparatus in accordance with claim 4 wherein the pressure of the fluid in said open space exceeds the pressure applied to said abrasive material, and wherein the pressure exerted by said pressure applying member exceeds the pressure in said open space.

6. An apparatus in accordance with claim 4 wherein said pressure applying member comprises a rubber tube, liquid under pressure included within said tube, and liquid maintained in a lower pressure included within said open space.

7. In a method for the handling of abrasive material in an apparatus wherein a portion of said apparatus is mounted for rotational movement in contact with said material, and wherein said portion of the apparatus comprises a rotatable shaft and an associated bearing with a stuffing box located in proximity with said bearing to prevent migration of said abrasive material to the vicinity of said bearing, the improvement comprising the steps of locating a first plastic packing around said shaft in a first annular chamber, said first chamber communicating with said abrasive material, locating a second plastic packing around said shaft in a second, larger, annular chamber, said second chamber and packing being located between said first chamber and said bearing, providing an open space around said shaft between said first and said second packings, applying fluid pressure in said open space in excess of the pressure prevailing on said abrasive material, and applying a uniform pressure around the exterior surface of said second plastic packing whereby said second packing exerts a pressure in excess of the pressure applied in said open space.

8. A method in accordance with claim 7 including the steps of inserting a flexible tubular member around said second plastic packing, and introducing fluid pressure into said tubular member to thereby provide said uniform pressure on said second packing.

References Cited by the Examiner
UNITED STATES PATENTS

| | | | |
|---|---|---|---|
| 632,442 | 9/1899 | Byle et al. | 277—34 |
| 2,439,463 | 4/1948 | Gabauer | 210—402 X |
| 2,726,883 | 12/1955 | Taylor | 277—34 |
| 3,164,420 | 1/1965 | Cramer | 308—36.3 |
| 3,193,097 | 7/1965 | Betz | 210—402 X |

SAMUEL ROTHBERG, *Primary Examiner.*